United States Patent [19]

Walker

[11] 4,079,547
[45] Mar. 21, 1978

[54] CELLULAR MOIST FILM PLANT CULTURE SYSTEM

[76] Inventor: Fred L. Walker, 50 W. Carmel Valley, Carmel Valley, Calif. 93924

[21] Appl. No.: 729,584

[22] Filed: Oct. 4, 1976

[51] Int. Cl.² .................... A01G 31/00; A01G 25/00
[52] U.S. Cl. ........................................ 47/62; 47/79; 47/80; 47/27
[58] Field of Search .............. 47/27, 56, 60, 62, 63, 47/64, 59, 73, 74, 78, 79, 80, 81, 66; 206/524.1; 229/87 P, 55, 66

[56] References Cited

U.S. PATENT DOCUMENTS

| | | | |
|---|---|---|---|
| 2,039,442 | 5/1936 | Mulford | 47/73 |
| 2,197,594 | 4/1940 | Rowell | 47/56 |
| 2,323,746 | 7/1943 | Woolf et al. | 47/56 X |
| 3,112,577 | 12/1963 | Burger | 47/74 |
| 3,172,234 | 3/1965 | Eavis | 47/56 |
| 3,241,264 | 3/1966 | Porter et al. | 47/81 |
| 3,273,284 | 9/1966 | Anagnostou | 47/74 |
| 3,315,408 | 4/1967 | Fisher | 47/56 X |
| 3,362,106 | 1/1968 | Goldring | 47/56 |
| 3,733,745 | 5/1973 | Ingerstedt et al. | 47/56 X |
| 3,872,621 | 3/1975 | Greenbaum | 47/56 X |
| 3,962,823 | 6/1976 | Zipperer | 47/73 |

Primary Examiner—E. H. Eickholt

[57] ABSTRACT

A system for growing a plant is provided in which an envelope defines a space in which the roots of the plant grow. Sheets of porous, flexible material which carry a number of nutrient packs are supported within the envelope. The sheets are partially submerged in a water reservoir and are constantly moistened by capillary action. The roots of the plant are physically supported by the sheets of flexible, absorbent material, and receive nutrients therefrom by absorbing nutrients which dissolve from the nutrient packs and pass through the moist film and into the root structure at a rate which increases with the rate of consumption of the nutrients by the plant.

17 Claims, 8 Drawing Figures

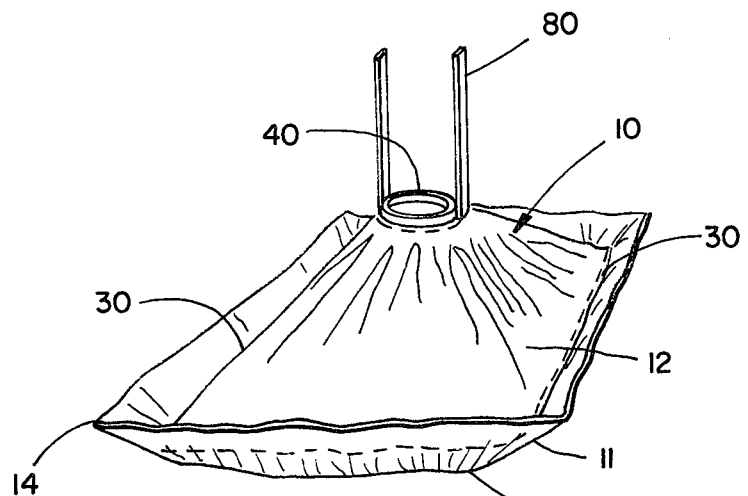
FIG _ 1
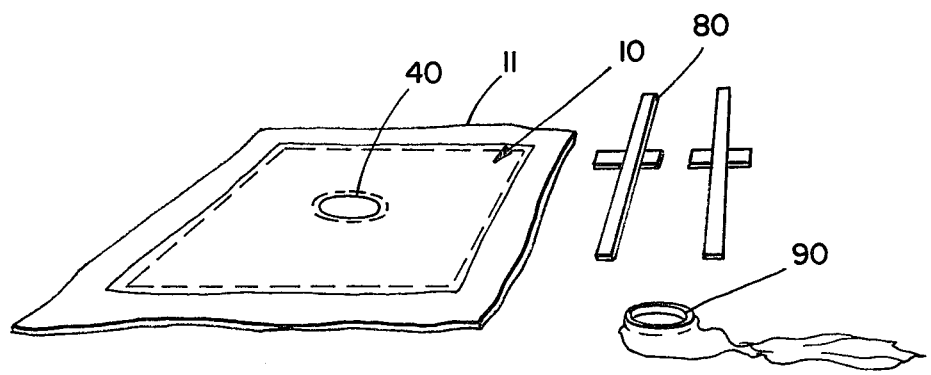
FIG _ 2
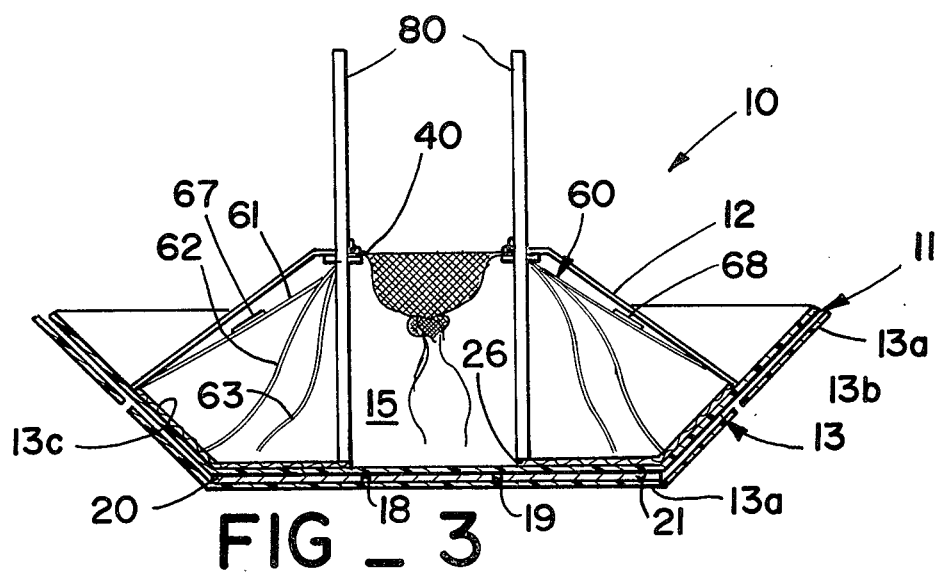
FIG _ 3

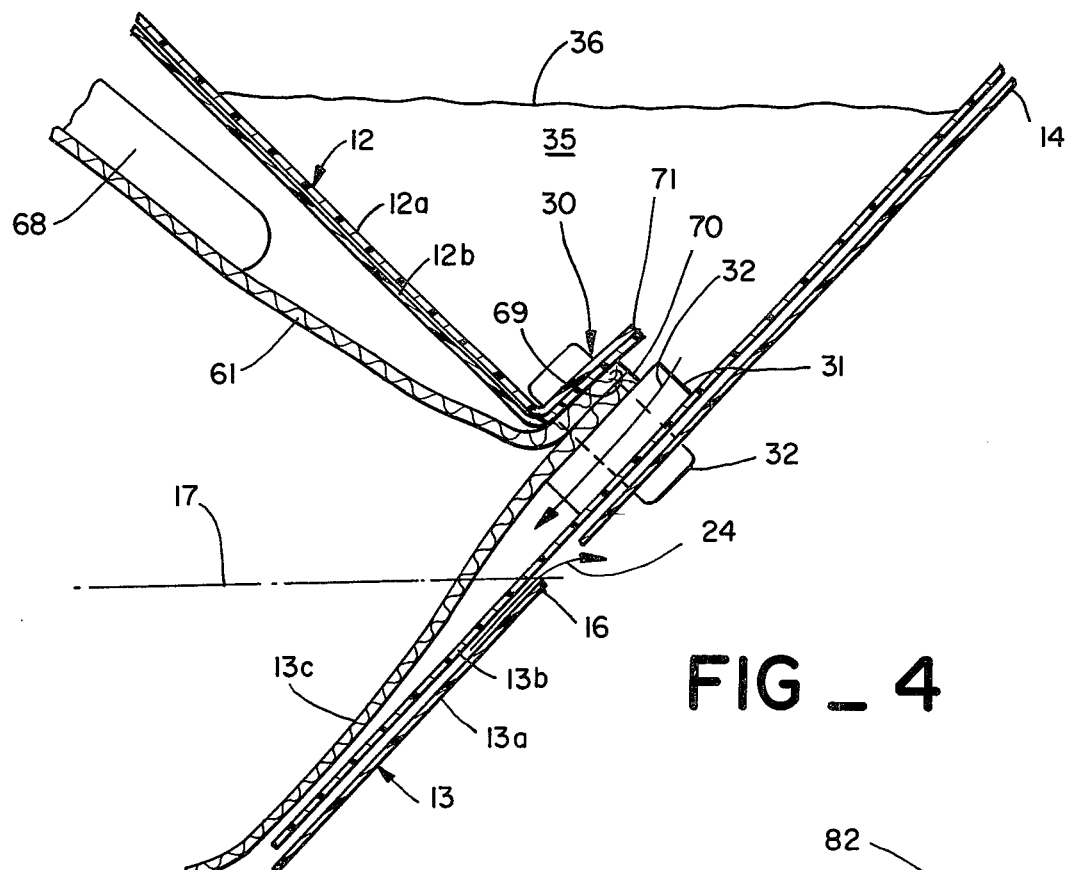
FIG_4
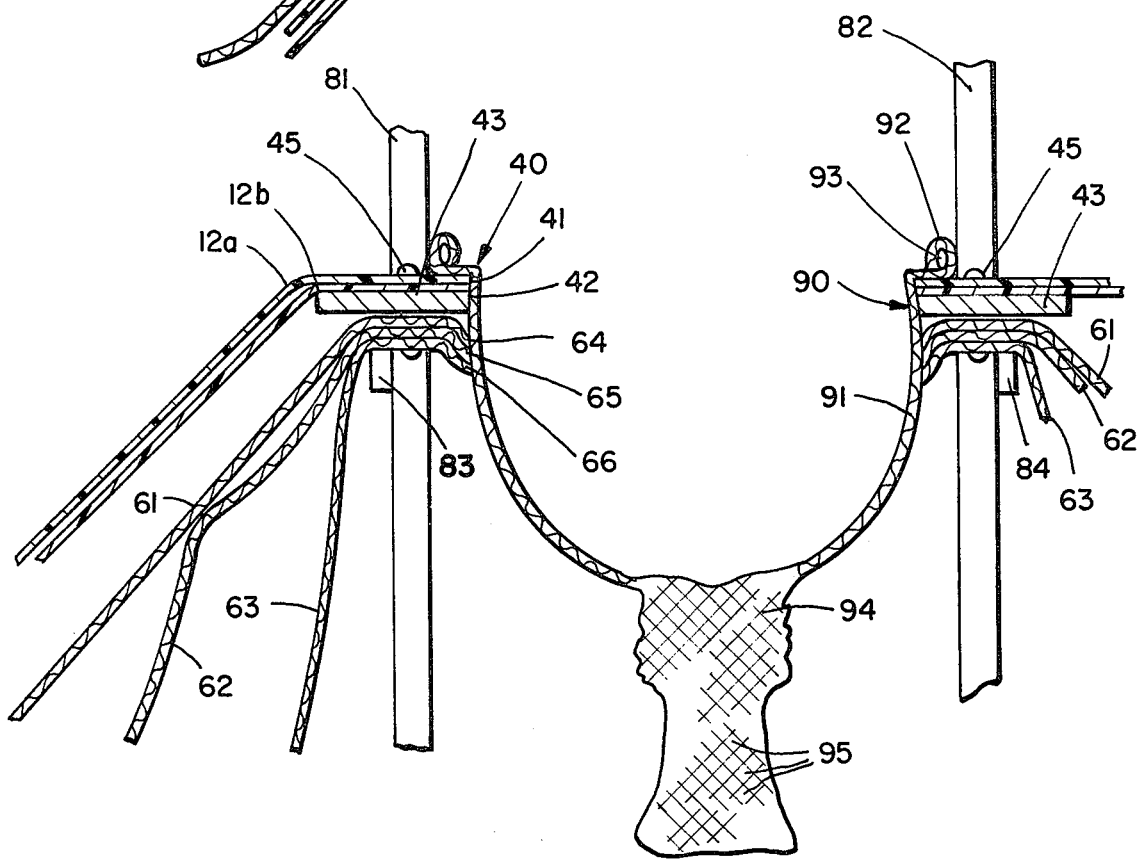
FIG_5

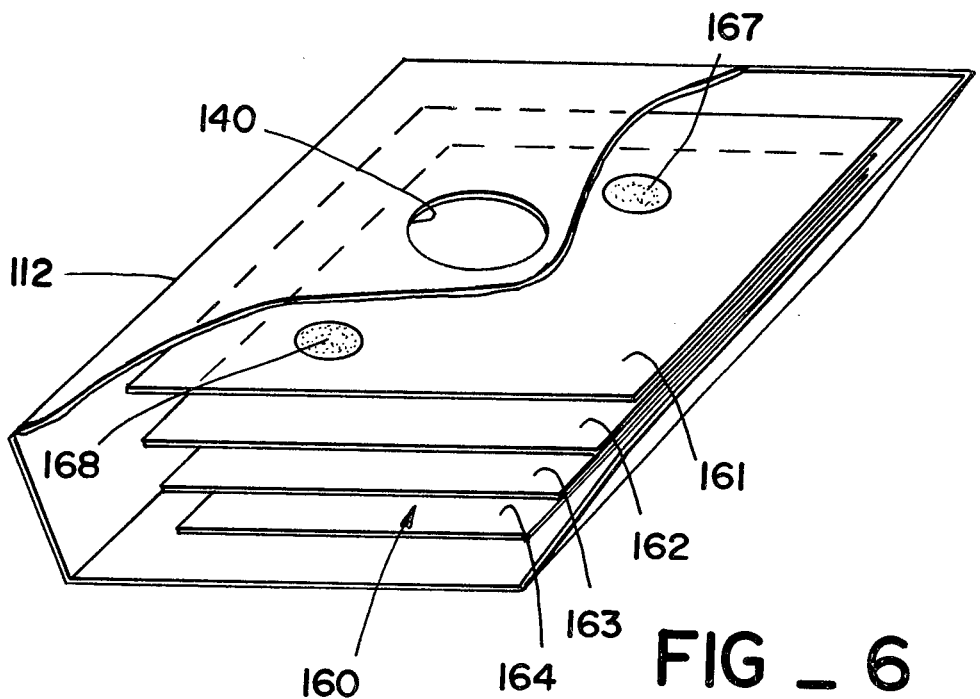
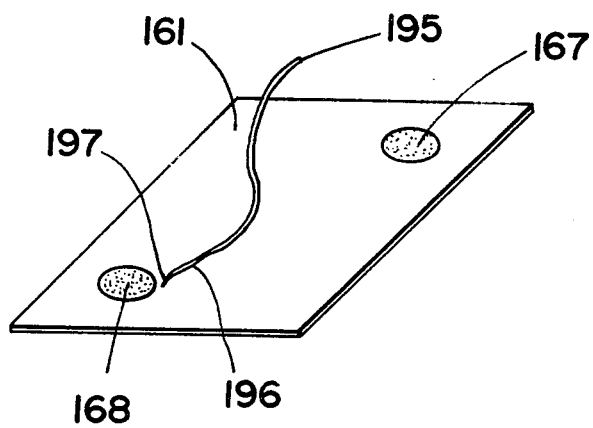
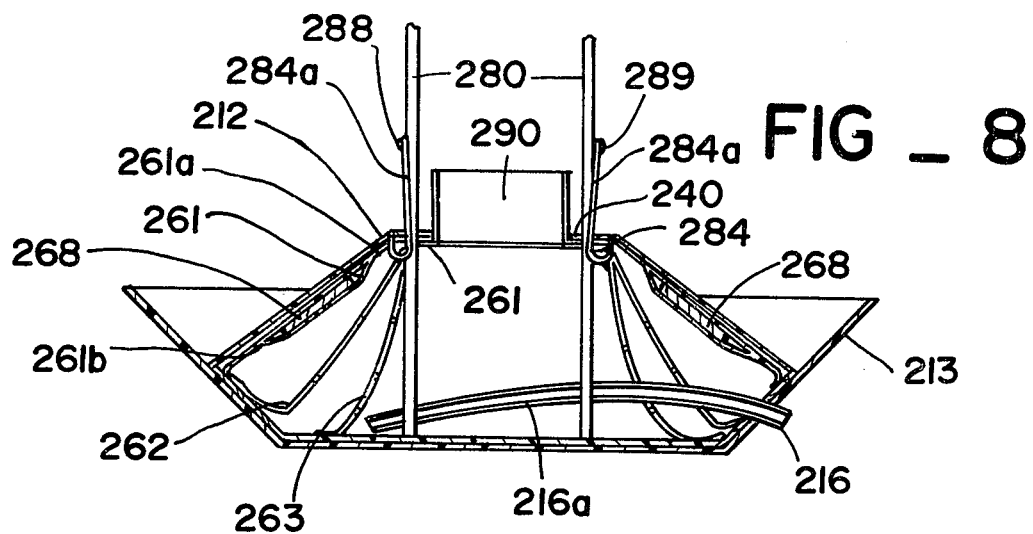

CELLULAR MOIST FILM PLANT CULTURE SYSTEM

This invention relates generally to plant support cells and more particularly to self-contained and self-regulating plant support cells.

Plant support cells have been known for some time. The Raines U.S. Pat. No. 2,026,322, dated Dec. 31, 1935, for "Receptacle for Growing Plants" teaches a hydroponic cell in which nutrients are supplied to the root structure by absorbent material in contact with the roots. The Raines cell was designed for demonstration to students and to the public as opposed to being a commercial plant growth cell. The Raines cell required periodic addition of nutrients to the nutrient bath at the upper portion of the cell.

It is also known in the prior art to provide plant support cells with inert root supporting material as shown in the Coburn U.S. Pat. No. 3,613,309, dated Oct. 19, 1971, for "Plant Cultivation". The Coburn patent teaches an inert root supporting material which fills the internal space of the cell.

The present invention provides a moist film plant culture system which is commercially usable and which does not require bulky, inert root supporting material. The cell has a root support structure made of porous, flexible material which contains nutrient packs. The roots of the plant are physically supported by the flexible material and also receive nutrients from the flexible material which is kept constantly moistened as described in greater detail below. The nutrients from the nutrient packs are released at a rate commensurate with the demand for such nutrients by the growing plant.

A primary object of the invention is to provide a plant culture system which is self-contained and which automatically regulates the flow of nutrients to the plant root system and which needs only intermittent watering to support a plant growth cycle.

A further object of the invention is to provide a moist film plant culture system in which nutrients are released from nutrient packs and flow through a moist film to the roots of the plant at a rate commensurate with the nutrient demand of the plant.

A further object of the invention is to provide a plant culture system in which the root support structure is a plurality of flexible, porous sheets of material which are disposed within an envelope such that air pockets in contact with the plant roots are formed between adjacent root support sheets.

A further object of the invention is to provide a plant culture system in which concentrated, undissolved pellets of nutrients are dispersed on a moist film and the rate of dissolvement of the nutrient pellets depends upon the concentration of nutrients in the moist film adjacent to the pellets.

A further object of the invention is to provide a plant culture system in which the root support system includes porous, absorbent material, part of which extends into a water reservoir, whereby the root support system is continually moistened by capillary action of water moving upwardly through the root support system from the reservoir.

Another object of the invention is to provide a moist film plant culture system having a defined space in which the roots of the plant grow formed by an envelope and having a root support system attached to the envelope to provide structural support for the roots of the plant.

Another object of the invention is to provide a cellular, moist film plant culture system in which an envelope forms a space in which the roots grow and which envelope is selectively impermeable to substances harmful to the roots of the plant.

Still another object of the invention is to provide a cellular, moist film plant culture system in which an envelope forming a space in which roots grow is sufficiently impermeable to water and air to prevent flooding of the roots of the plant and to prevent substantial evaporation of the moist film which supplies nutrients to the root structure.

A still further object of the invention is to provide a cellular, moist film plant culture system having an envelope forming a space in which the plant roots grow wherein the top of the envelope is impermeable to sunlight and the bottom of the envelope is permeable to radiant ground heat, whereby temperature variations within the envelope are minimized.

A further object of the invention is to provide a cellular, moist film plant culture system in which any undesirable chemical residues which build up within the system may be flushed through the system by periodic overwatering.

Another object of the invention is to provide a commercially usable plant support cell which does not require bulky root support material.

Another object of the invention is to provide a collapsible plant support cell which can be efficiently transported and stored; as well as being readily assembled for use.

Further objects and advantages will become apparent from the following description of the preferred embodiment and drawings, wherein:

FIG. 1 is a perspective view of the cell;

FIG. 2 is a perspective view of the components of the cell in the collapsed position;

FIG. 3 is an elevational view, in section, of the cell;

FIG. 4 is an elevational view, in section, of a portion of the cell shown in FIG. 3;

FIG. 5 is an elevational view, in section, of another portion of the cell shown in FIG. 3;

FIG. 6 is a schematic representation of an alternate embodiment of the invention;

FIG. 7 is a schematic representation of a portion of the system shown in FIG. 6; and FIG. 8 is a sectional view of an alternate embodiment.

In the drawings, FIGS. 1 through 5 show the preferred embodiment of the invention. FIGS. 6 and 7 shown as alternate embodiment of the invention. Since the concepts shown in the embodiment of FIGS. 6 and 7 are broader than those shown in FIGS. 1-5, a description of the embodiment shown in FIGS. 6 and 7 will be described first.

An envelope means 112 defines a space in which the roots of the plant grow. Root support means 160 includes a plurality of sheets 161, 162, 163 and 164, which are generally parallel, and each of which contain one or more nutrient packs 167 and 168 which are concentrated, undissolved pellets.

An opening 140 is formed in the upper section of envelope 112, through which the upper portion of the plant grows. Sheets 161, 162, 163 and 164 are attached to the side walls of envelope 112. Root support means 160 is constantly moistened by periodic watering. The constantly moistened root support means 160 provides physical support for the roots of the plant as well as nutrient support for the roots. As the roots extend outwardly across root support means 160, water and dissolved nutrients enter the roots, decreasing the concentration of the absorbed nutrients in the region immediately adjacent the root. The decrease in concentration of a particular nutrient or nutrients causes more of those nutrients to be dissolved from nutrient packs 167 and 168 into the moist film carried by root support means 160. Therefore, the nutrients are released from the nutrient packs 167 and 168 at a rate which is commensurate to the rate at which these nutrients are absorbed by the roots of the plant.

FIG. 7 is a schematic representation showing a root 195 growing along the surface of sheet 161. Sheet 161 is constantly moistened, and as water and dissolved nutrients enter root 195 at point 197 and similar points along the length of root 195, the concentration of absorbed nutrients at point 196 adjacent the root decreases. This decrease in concentration of absorbed nutrients causes more of those absorbed nutrients to be dissolved from the closest nutrient pack 168 and pass through the moist film to root 195.

In the embodiment shown in FIG. 6, a water reservoir may be created in the bottom portion of envelope 112 and root support means 160 can be constantly moistened by connecting porous sheets of material from the water reservoir to sheets 161, 162, 163 and 164 so that, by capillary action from the reservoir, root support means 160 is kept moist and the only requirement for watering the cell is to intermittently replenish the reservoir in envelope 112.

Referring to the embodiment shown in FIGS. 1-5, the collapsible, moist film plant culture cell is shown generally as 10. FIG. 1 shows cell 10 in its assembled or distended position and FIG. 2 shows cell 10 in its collapsed position.

A flexible envelope means shown generally as 11 has an upper membrane 12 and a lower membrane 13 which form the exterior surface of cell 10. Membranes 11 and 12 are made of selectively, semi-permeable material; membrane 11 is permeable to radiated ground heat and impermeable to water; membrane 12 is impermeable to sunlight.

Throat means 40 defines an opening in upper membrane 12 and is the opening through which the upper portion of the plant extends into the atmosphere.

Flexible root support means 60 is shown best in FIG. 3. Root support means 60 provides physical root support and simultaneously provides water and mineral nutrients to the root structure as will be described in greater detail below.

Envelope support means 80 is used to elevate upper membrane 12 with respect to lower membrane 13 to define an enclosed space in which the roots of the plant are supported. With envelope support means 80 in position as shown in FIG. 3, cell 10 is in its assembled or distended position, ready to receive a seed pack.

Lower membrane 13 has three layers; an outer layer 13a, a middle layer 13b, and an inner layer or bottom liner 13c, as shown best in FIG. 4. Outer layer 13a is made of black, impermeable material such as polyethylene in 10 mil thickness. Outer layer 13a forms the bottom exterior surface of the cell.

A rigid base plate 20, which may be metal, is provided on the upper surface of outer membrane 13a. Base plate 20 has a circular perimeter 21.

The middle layer 13b of lower membrane 13 is coextensive with outer layer 13a. Middle layer 13b extends across the upper surface of base plate 20. Drain holes 18 and 19 are provided in the central portion of middle layer 13b, so that water 17 may flow through drain holes 18 and 19, through the base plate 20 and through the space between outer layer 13a and middle layer 13b through drain 16 as shown by arrow 24 in FIG. 4.

Upper membrane 12 has two layers; an outer layer 12a and an inner layer 12b, to provide maximum thermal insulation for the cell. Outer layer 12a is impermeable to water and air and is light in color to reflect incident sunlight. Inner layer 12 is dark in color to absorb energy radiating outwardly from the interior of cell 10.

Upper membrane 12 is connected to lower membrane 13 by a seam 30. Seam 30 is formed by stitches 32 which extend through upper membrane 12 and lower membrane 13. The perimeter of seam 30 is located outwardly of the perimeter 21 of base plate 20 and inwardly of the perimeter 14 of lower membrane 13. When support means 80 is inserted into the cell, lower membrane 13 is pulled upwardly at seam 30 and the outer perimeter 14 of membrane 13 is elevated above the level of seam 30, as shown in FIG. 4. In this position, the upper, exposed surfaces of outer layer 12a of membrane 12 and of middle layer 13b of lower membrane 13 form a water catchment, shown generally as 35 in FIG. 4 for holding water 36. The perimeter 14 of membrane 13 is square in its configuration and the perimeter 21 of base plate 20 is circular. This combination allows perimeter 14 of lower membrane 13 to assume a substantially level configuration, to maximize the capacity of catchment 35.

Filter means 31 is disposed along seam 30 and allows air and water to enter the cell along the direction of arrow 32, but prevents the entrance of granular particles and insects, and other substances harmful to the roots of the plant. Filter means 31 is placed between the inner layer 13c and the middle layer 13b of membrane 13, and is held in place by stitching 32. Filter means 31 is made of material sufficiently porous to allow water and air to pass therethrough, such as bamboo slits. Water from catchment 35 flows through filter means 31 downwardly between inner layer 13c and middle layer 13b of lower membrane 13 into the interior of cell 10.

Inner layer 13c is an absorbent liner made from burlap and extends inwardly to a position adjacent drain holes 18 and 19, as shown in FIG. 3. The end 26 of absorbent liner 13c is held in position by the bottom ends of support means 80. Absorbent liner 61 has its lower end 69 held in contact with the upper end 70 of liner 13c. The end 71 of upper membrane 12 extends beyond the ends 69 and 70 of liners 61 and 13c respectively to minimize direct sunlight and wind exposure of liners 13c and 61.

Water enters the cell by two different means, through throat 40 and through filter means 31 and is stored at the bottom of space 15 and is shown generally as 17.

Throat means 40, shown best in FIG. 5, provides the upper support for root support means 60. Throat means 40 is formed by circular holes 41 and 42 formed in the center of the inner and outer layers 12a and 12b of outer membrane 12. Absorbent liners 61, 62 and 63 have circular holes 64, 65 and 66 centered therein which are aligned with circular holes 41 and 42 formed in membrane 12. These aligned circular holes describe the opening of throat means 40. A stiff collar 43 of circular design is inserted between the inner layer 12b of membrane 12 and absorbent liner 61. Collar 43 has slots cut into it to receive supporting stems 81 and 82. The cross pieces 83 and 84 of stems 81 and 82 form the vertical support for collar 43 and hold the cell in its distended position shown in FIG. 1. Collar 43 is firmly attached to liners 61, 62 and 63 and to inner and outer layers 12a and 12b of upper membrane 12 by stitching 45. The ends 64, 65 and 66 of absorbent liners 61, 62 and 63 extend inwardly beyond the inner edge of collar 43 to ensure good contact with planting pocket 90.

Planting pocket 90 is a cylindrical sack 91 of absorbent material with the top edge 92 hemmed and a wire hoop stiffener 93 enclosed within the hem. The cylindrical sack 91 is burlap and the material below hem 92 is slashed into wide sections which are gathered together and fastened at fastening point 94, below which trailing ribbons 95 extend downwardly so that they will reach the bottom of the cell when the cell is distended. Plant pocket 90 is in intimate contact with liners 61, 62 and 63, and is constantly moistened by capillary action as described in greater detail below. A seed pack may be inserted into plant pocket 90 and typically fills approximately one half of pocket 90 so that rain water or spray falling on plant pocket 90 flows downwardly through the seed pack and moistens the trailing ribbons 95.

Flexible root support means 60 comprises absorbent liners 61, 62 and 63. Each of these liners is a sheet of burlap with a circular hole centered therein to form throat means 40. Each of the liners extends downwardly from throat means 40. Liner 61 is attached at its downward end to seam 30 and supports nutrient packs 67 and 68. Nutrient packs 67 and 68 can be made from the following mixture:

12 lbs. ground limestone (dolomite)
5 lbs. calcium sulphate (gypsum)
1.5 lbs. calcium nitrate
2.5 lbs. 20% superphosphate
10 lbs. Osmocote 18-6-12 (9 month)
6 oz. Fritted trace elements (FTE 503)
1 oz. iron (chelated such as NaFe 138 or 330)
0.5 lbs. Magnesium sulphate (Epsom salts)

A nutrient pack may also be located on trailing ribbons 95.

The absorbent liners are so situated in the cell that the mineral nutrients are slowly released from nutrient packs 67 and 68 by capillary action. As a plant in pocket 90 starts growing, its roots tend to spread down liners 61, 62 and 63 as well as down trailing ribbons 95. As the root structure grows downwardly along these absorbent liners, the roots absorb water and mineral nutrients which are moving slowly through the liners by capillary action. The roots are not exposed to excessive amounts of nutrient or water at any point in time, but rather are furnished with a steady, controlled input of water, mineral nutrient and air. Water 17 flows upwardly along bottom liner 13c and as shown in FIG. 4, liner 13c intersects liner 61 at seam 30. Water flows from liner 13c to liner 61 past nutrient pack 68 where small amounts of mineral nutrients diffuse into liner 61 and move upwardly toward the root structure.

By placing nutrient packs 67 and 68 approximately midway between throat means 40 and seam 30, the cell may be flushed without exhausting the nutrient packs. To flush the cell, water may be sprayed on the upper surface of the cell, which enters pocket 90 and through seam 30, tending to flush the residues in the bottom of the cell outwardly through drain 16. The flushing water does not exhaust nutrient packs 67 and 68 because the drain 16 is lower than the nutrient packs, adjacent the lower edge of seam 30, and prevents the water level from rising to the level of the nutrient packs.

As shown in FIG. 2, the cell may be readily collapsed into a flat form for easy transportation and storage. The cell material may be made of biodegradable material so that the spent cell can be plowed or turned into the soil.

Drain holes 16 are located on opposite ends of the cell so that the cell may be used on sloping surfaces with the downward end of the cell not having a drain hole in it.

To compensate for local water conditions, additional nutrient packs with trace elements can be supplied to compensate for any particular deficiencies in the mineral content of a given local water supply.

Residues forming on the absorbent liners 61, 62 and 63 are washed downward partly by the action of irrigation water entering throat means 40, and partly by the circulating action of evaporated storage water condenses on the inner surface of layer 12b and flows downwardly to the storage pool 17. The storage pool 17 is emptied through drain holes 18 and 19.

The perimeter of the cell 14 is square. Cells can be aligned so as to substantially cover a given plot of ground and the design of the upper surfaces of the cells is such that virtually all of the incident rainfall and water supply passes to the interior of the cell. This is an extremely important feature in areas where water is scarce or unduly expensive. The cell is automatic once a seed pack is placed in pocket 90. The mineral nutrients are released gradually and the water flows upwardly through the liners at a controlled rate. The gardener need only water the cell occasionally.

The root support means 160 and 60 are perforated as by slashing, to allow air circulation throughout the system. Root support means 60 forms a continuous network of porous material with plant pocket 90 to assure continuous moistening of a seed pack which is inserted into plant pocket 90. It is understood that plant pocket 90 forms a seed bed for a seed pack.

FIG. 8 shows an alternate embodiment of the invention with the last two digits of the reference numerals referring to corresponding parts of the device as the last two digits in FIGS. 1-7. The embodiment shown in FIG. 8 uses a drain tube 216a which extends through drainage opening 216 in envelope wall 213. The use of drain tube 216a facilitates the use of a single layer outer membrane 213 as opposed to the two membranes 13a and 13b required for drainage, shown best in FIG. 4 in the earlier described embodiment. The exterior membrane 213 of the embodiment shown in FIG. 8 is waxed cardboard prescored at the corners for bending when the system is placed in the distended position shown in FIG. 8. Planting pocket 290 is a detachable cylinder of porous, absorbent material inserted into opening 240 by the user. Planting pocket 290 is supported by porous membrane 261 which in turn is supported by ring 284 suspended from support members 280 by support hooks 284a. Liner 261 is stapled to upper membrane 212 at points 261a and 261b to form a support for nutrient pack 268.

Support members 280 are simply straight sections of wood in which screws 288 and 289 are inserted. Hooks 284a are suspended from screws 288 and 289 and extend around support ring 284 which is a circular ring extending around the periphery of opening 240 to support the system in the distended position shown in FIG. 8. By removing support members 280 and planting pocket 290, the system shown in FIG. 8 collapses to a flat, easily storable configuration.

I claim:

1. A cellular, moist film, plant culture system for growing a plant comprising:

envelope means defining a space in which the roots of said plant grow, said envelope means having an opening through which the stem of said plant may grow, and porous support means within said envelope means on which the roots of said plant grow having a moist film in contact with said roots and having one or more nutrient packs on said moist film, said packs saturating said film with nutrients whereby nutrients are released from said nutrient packs and flow through said moist film to said roots at a rate (which increases) commensurate with the rate of consumption of said nutrients by said plant.

2. The apparatus of claim 1 wherein said root support means comprises a plurality of flexible, porous sheets of material, each of which carries a moist film, and said sheets being disposed within said envelope means such that air pockets in contact with the roots are formed between adjacent sheets.

3. The apparatus of claim 1 wherein said nutrient packs are concentrated, undissolved pellets dispersed on said moist film, whereby the rate of dissolvement of said nutrient packs depends upon the concentration of nutrients in the moist film adjacent to said packs.

4. The apparatus of claim 1 further comprising a water reservoir within said envelope means and wherein said root support means comprises a porous, absorbent material part of which is suspended above said water reservoir and part of which extends into said water reservoir, whereby said root support means is continually moistened by said water reservoir.

5. The apparatus of claim 1 wherein said root support means comprises one or more sheets of absorbent material attached to said envelope means to provide structural support for the roots of said plant.

6. The apparatus of claim 1 wherein said envelope means is selectively impermeable to substances harmful to the roots of said plant.

7. The apparatus of claim 1 wherein said envelope means is sufficiently impermeable to water and air to prevent flooding of the roots of said plant and to prevent substantial evaporation of said moist film.

8. The apparatus of claim 1 wherein the top of said envelope means is impermeable to sunlight and the bottom of said envelope means is permeable to radiant ground heat, whereby temperature variations within said envelope means are minimized.

9. The apparatus of claim 1 further comprising drain means located below said nutrient packs such that chemical residues may be flushed through said drain means by periodically overwatering the system.

10. The apparatus of claim 2 wherein said root support means is perforated to allow air circulation throughout said space.

11. A collapsible, cellular, moist film, plant culture system for growing a plant comprising:

flexible envelope means with an upper membrane and a lower membrane forming the exterior of said system, throat means defining an opening in said upper membrane of said envelope means, flexible root support means within said envelope means connected to said throat means, and envelope support means for elevating said upper membrane of said envelope means with respect to said lower membrane of said envelope means and defining an enclosed air space within which the roots of said plant are physically supported and nourished by said root support means.

12. The apparatus of claim 11 wherein said upper and lower membranes are impermeable to water and said envelope means further comprises:

a rigid base plate on the upper surface of said lower membrane, a seam formed between said upper and lower membranes located outwardly of the perimeter of said base plate and inwardly of the perimeter of said lower membrane such that when said envelope support means elevates said upper membrane into a distended position, the upper surface of the cell forms a water catchment for rain or irrigation water.

13. The apparatus of claim 12 wherein filter means is disposed along said seam to permit water to flow from said water catchment to the interior of said envelope means.

14. The apparatus of claim 13 wherein said lower membrane comprises three layers, the outer layer having a drain hole adjacent said seam, and wherein said filter means is disposed between the middle and inner layers of said lower membrane.

15. The apparatus of claim 11 wherein said cell contains water at the bottom of said enclosed space and said root support means comprises a plurality of flexible, absorbent sheets of porous material which extend into said water, which support nutrient packages and which physically support the roots of said plant while simultaneously nourishing said roots with water and dissolved mineral nutrients by capillary action.

16. The apparatus of claim 15 further comprising a flexible, absorbent, porous seed bed connected to said throat means and forming a pocket for receiving seeds when said upper membrane is elevated with respect to said lower membrane.

17. The apparatus of claim 16 wherein said seed bed is connected to said root support means to form a continuous network of porous material within said envelope means to assure continuous moistening of said seed bed.

* * * * *